US009593996B2

(12) United States Patent
Brucker

(10) Patent No.: US 9,593,996 B2
(45) Date of Patent: Mar. 14, 2017

(54) IONIZATION GAUGE FOR HIGH PRESSURE OPERATION

(71) Applicant: MKS Instruments, Inc., Andover, MA (US)

(72) Inventor: Gerardo A. Brucker, Longmont, CO (US)

(73) Assignee: MKS Instruments, Inc., Andover, MA (US)

( * ) Notice: Subject to any disclaimer, the term of this patent is extended or adjusted under 35 U.S.C. 154(b) by 230 days.

(21) Appl. No.: 14/377,449

(22) PCT Filed: Feb. 7, 2013

(86) PCT No.: PCT/US2013/025198
§ 371 (c)(1),
(2) Date: Aug. 7, 2014

(87) PCT Pub. No.: WO2013/119851
PCT Pub. Date: Aug. 15, 2013

(65) Prior Publication Data
US 2015/0300904 A1   Oct. 22, 2015

Related U.S. Application Data

(60) Provisional application No. 61/596,470, filed on Feb. 8, 2012.

(51) Int. Cl.
*H01J 27/02* (2006.01)
*B01D 59/44* (2006.01)
(Continued)

(52) U.S. Cl.
CPC .......... *G01L 19/0627* (2013.01); *G01L 21/30* (2013.01); *G01L 21/32* (2013.01);
(Continued)

(58) Field of Classification Search
CPC ......... G01L 21/32; G01L 21/34; G01L 21/30; H01J 41/04; H01J 41/02; H01J 41/12;
(Continued)

(56) References Cited

U.S. PATENT DOCUMENTS 3,244,969 A * 4/1966 Herb .................. H01J 9/38
313/231.01
3,446,958 A   5/1969 Cambou et al.
(Continued)

FOREIGN PATENT DOCUMENTS

WO   WO 2009/085165 A2   7/2009
WO   WO 2010/033427 A1   3/2010

OTHER PUBLICATIONS

PCT/US2013/025198, Transmittal of International Preliminary Report on Patentability (IPRP) with IPRP, "Ionization Gauge for High Pressure Operation," mailed Aug. 21, 2014.
(Continued)

*Primary Examiner* — Alesa Allgood
(74) *Attorney, Agent, or Firm* — Hamilton, Brook, Smith & Reynolds, P.C.

(57) ABSTRACT

An ionization gauge to measure pressure, while controlling the location of deposits resulting from sputtering when operating at high pressure, includes at least one electron source that emits electrons, and an anode that defines an ionization volume. The ionization gauge also includes a collector electrode that collects ions formed by collisions between the electrons and gas molecules and atoms in the ionization volume, to provide a gas pressure output. The electron source can be positioned at an end of the ionization volume, such that the exposure of the electron source to atom flux sputtered off the collector electrode and envelope surface is minimized. Alternatively, the ionization gauge can include a first shade outside of the ionization volume, the first shade being located between the electron source and the
(Continued)

collector electrode, and, optionally, a second shade between the envelope and the electron source, such that atoms sputtered off the envelope are inhibited from depositing on the electron source.

4 Claims, 13 Drawing Sheets

(51) Int. Cl.
    *G01L 19/06*     (2006.01)
    *G01L 21/32*     (2006.01)
    *H01J 41/04*     (2006.01)
    *G01L 21/30*     (2006.01)
    *H01J 1/52*     (2006.01)
    *H01J 41/02*     (2006.01)

(52) U.S. Cl.
    CPC ............... *H01J 1/52* (2013.01); *H01J 41/02* (2013.01); *H01J 41/04* (2013.01)

(58) Field of Classification Search
    CPC .. H01J 1/304; H01J 2201/30469; H01J 35/06; H01J 37/3171; H01J 41/06; H01J 49/10; H01M 8/04395; Y02E 60/50
    USPC ............... 324/460, 459, 462, 464, 465, 468; 250/374, 423 R, 283, 427, 281, 382, 389, 250/397, 423 F, 492.2, 492.3, 493.1
    See application file for complete search history.

(56) References Cited

U.S. PATENT DOCUMENTS

| | | | |
|---|---|---|---|
| 3,839,655 A | 10/1974 | Helgeland et al. | |
| 4,636,680 A | 1/1987 | Bills et al. | |
| 4,792,763 A | 12/1988 | Haas | |
| 5,132,586 A * | 7/1992 | Boulais | H01J 43/246 250/423 R |
| 5,304,799 A | 4/1994 | Kurzweg | |
| 5,387,247 A * | 2/1995 | Vallana | A61F 2/0077 204/192.11 |
| 5,422,573 A * | 6/1995 | Bills | H01J 41/04 250/374 |
| 6,474,171 B1 * | 11/2002 | Holme | G01L 21/34 73/753 |
| 7,049,823 B2 * | 5/2006 | Correale | B82Y 10/00 324/460 |
| 7,087,912 B2 * | 8/2006 | Hamamoto | C23C 14/48 250/492.1 |
| 7,497,110 B2 | 3/2009 | Liepert | |
| 2001/0002696 A1 * | 6/2001 | Kato | H01J 49/147 250/281 |
| 2001/0011890 A1 | 8/2001 | Kawasaki et al. | |
| 2003/0057953 A1 | 3/2003 | Rutherford et al. | |
| 2005/0028602 A1 | 2/2005 | Correale | |
| 2005/0030044 A1 * | 2/2005 | Correale | G01L 21/34 324/460 |
| 2005/0184735 A1 | 8/2005 | Arnold et al. | |
| 2009/0146665 A1 | 6/2009 | Knott | |
| 2011/0062961 A1 | 3/2011 | Brucker | |
| 2011/0163754 A1 * | 7/2011 | Carmichael | G01L 21/32 324/460 |
| 2011/0234233 A1 | 9/2011 | Brucker | |

OTHER PUBLICATIONS

Dong, C., et al., "Ultra High Vacuum Instrumentation Development Studies," Accelerator Development, Thomas Jefferson National Accelerator Facility and Department of Physics, Old Dominion University, Abstract No. 956, JLAB-ACE-98-03, 22 Pages.

Notification of Transmittal of the International Search Report and the Written Opinion of the International Searching Authority, or the Declaration for International Application No. PCT/US2013/025198, "Ionization Gauge for High Pressure Operation", Date of mailing: May 6, 2013.

\* cited by examiner

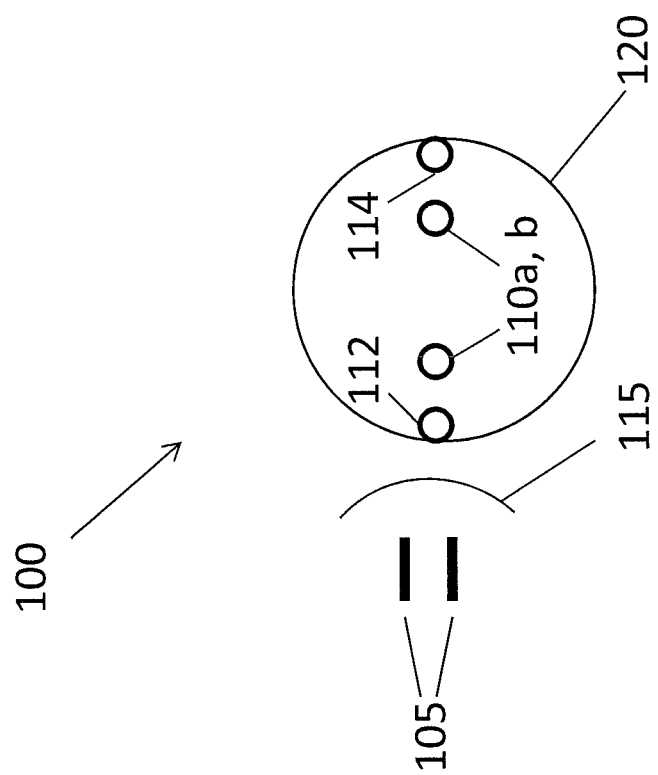

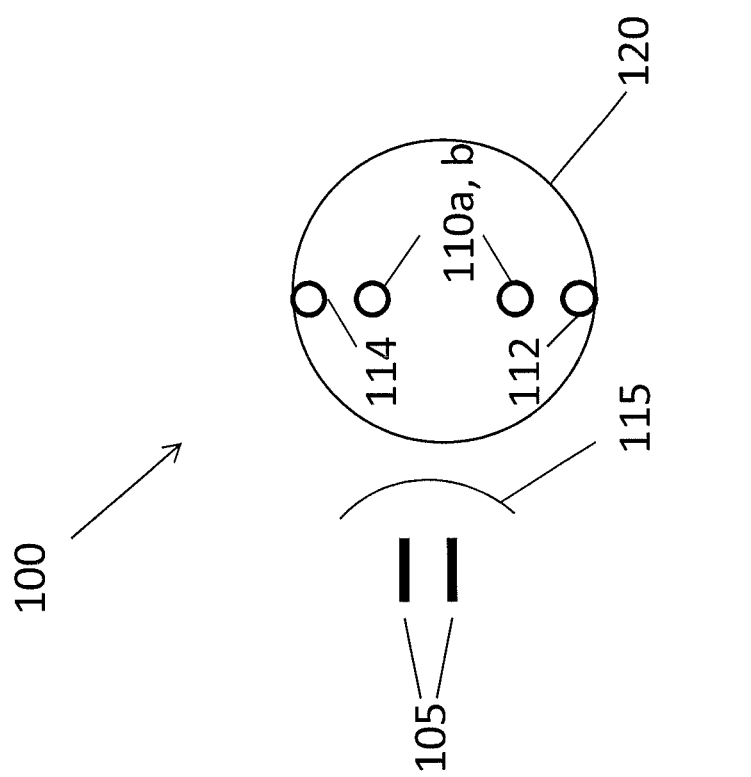

IONIZATION GAUGE FOR HIGH PRESSURE OPERATION

RELATED APPLICATIONS

This application is the U.S. National Stage of International Application No. PCT/US2013/025198, filed Feb. 7, 2013, which claims the benefit of U.S. Provisional Application No. 61/596,470 filed Feb. 8, 2012.

The entire teachings of the above application are incorporated herein by reference.

BACKGROUND OF THE INVENTION

Ionization gauges, more specifically Bayard-Alpert (BA) ionization gauges, are the most common non-magnetic means of measuring very low pressures. The gauges have been widely used worldwide. These gauges were disclosed in 1952 in U.S. Pat. No. 2,605,431, which is herein incorporated by reference in its entirety. A typical ionization gauge includes an electron source, an anode, and an ion collector electrode. For the BA ionization gauge, the electron source is located outside of an ionization space or anode volume which is defined by a cylindrical anode screen. The ion collector electrode is disposed within the anode volume. Electrons travel from the electron source to and through the anode, cycle back and forth through the anode, and are consequently retained within, or nearby to, the anode.

In their travel, the electrons collide with molecules and atoms of gas that constitute the atmosphere whose pressure is desired to be measured. This contact between the electrons and the gas creates ions. The ions are attracted to the ion collector electrode, which is typically connected to ground. The pressure of the gas within the atmosphere can be calculated from ion and electron currents by the formula $P=(1/S) (I_{ion}/I_{electron})$, where S is a coefficient with the units of 1/Torr and is characteristic of a particular gauge geometry, electrical parameters, and pressure range.

The operational lifetime of a typical ionization gauge is approximately ten years when the gauge is operated in benign environments. However, these same gauges and electron sources (cathodes) fail in minutes or hours when operated at too high a pressure or during operation in gas types that degrade the emission characteristics of the electron source. Sputtering is a problem when operating the ionization gauge at high pressures, such as above $10^{-4}$ Torr. This is a problem at high pressure because there is more gas to ionize. This sputtering is caused by high energy impacts between ions and components of the ionization gauge. Ions with a high energy may impact a tungsten material that forms a collector post of the ionization gauge. These impacts result in atoms being ejected from the collector post and envelope surfaces with significant internal kinetic energies. Ejected material can travel freely to other surfaces within the line of sight of the sputtered surfaces, and can cause gauge failure by coating the cathode or by coating of the feedthrough insulators of the gauge, which can result in electric leakages.

Therefore, there is a need for an ionization gauge design that minimizes or eliminates the above mentioned problems.

SUMMARY OF THE INVENTION

Coating of the electron source, such as a hot filament, is facilitated by the typical arrangement, shown in FIG. 1, of the filament and collector structures side by side to one another in a parallel arrangement, often with a large surface area of the filament facing the collector surface. The present ionization gauge minimizes the effects of self-sputtering on filament emission efficiency by inhibiting the sputtered atoms from finding straight paths from the collector to the electron source in the gauge.

There is provided an ionization gauge to measure pressure while controlling the location of deposits resulting from sputtering when operating at high pressure. The ionization gauge can include an anode structure comprising a mesh grid defining an ionization volume in which electrons impact gas molecules and atoms. The mesh grid can be a cylindrical mesh grid. The ends of the grid define the ends of the ionization volume. The ionization gauge also includes a hot cathode electron source that emits electrons. The electron source can be positioned at an end of the ionization volume. The ionization gauge further includes a collector electrode to collect ions formed by collisions between the electrons and gas molecules and atoms, to provide a gas pressure output. The collector electrode extends along a collector axis through the ionization volume, the collector axis extending through the ends of the ionization volume. Alternatively, the hot cathode electron source can be a ribbon filament positioned side by side to the collector electrode, the ribbon filament having a flat surface oriented at about 90° with respect to the collector electrode, such that the surface area of the filament facing the collector is minimized.

In yet another alternative, an ionization gauge can include an anode structure comprising a mesh grid defining an ionization volume in which electrons impact gas molecules and atoms, and an electron source that emits electrons. The mesh grid can be a cylindrical mesh grid. The ionization gauge also includes a first collector electrode to collect ions formed by collisions between the electrons and gas molecules and atoms, to provide a gas pressure output. The ionization gauge further includes a first shade outside of the ionization volume, the first shade being located between the electron source and the first collector electrode. One of the first collector electrode and the electron source is located inside the anode structure, and the other of the first collector electrode and the electron source is located outside the anode structure. If the source that emits electrons is located outside the anode structure and the first collector electrode is located inside the anode structure, then the ionization volume can be inside the anode structure, and, optionally, the ionization gauge can further include a second collector electrode located inside the anode structure. As an additional option, the ionization gauge can further include a third collector electrode located outside the anode structure, in between the first shade and the anode structure. Alternatively, the source that emits electrons can be located inside the anode structure and the first collector electrode can be located outside the anode structure. The electron source can be a hot cathode or a microchannel plate.

The ionization gauge can further include an envelope surrounding the electron source, the anode, and the first collector electrode. Optionally, a second shade can be located between the envelope and the electron source, such that atoms sputtered off the envelope are inhibited from depositing on the electron source.

A method of measuring pressure with an ionization gauge includes emitting electrons from a hot cathode electron source positioned at an end of an ionization volume, the electrons colliding with gas molecules and atoms inside an anode structure comprising a cylindrical mesh grid that defines the ionization volume. The method further includes collecting ions formed by collisions between the electrons and gas molecules and atoms on a collector electrode to provide a gas pressure output. The collector electrode extends along a collector axis through the ionization volume, the collector axis extending through the ends of the ionization volume. The pressure can be in a range of between about $10^{-1}$ Torr and about $10^{-4}$ Torr.

Alternatively, a method of measuring pressure with an ionization gauge includes emitting electrons from an electron source, the electrons colliding with gas molecules and atoms inside an anode structure comprising a mesh grid that defines an ionization volume. The mesh grid can be a cylindrical mesh grid. The method further includes locating a first shade outside of the ionization volume between the electron source and a first collector electrode, one of the first collector electrode and the electron source being located inside the anode structure, and the other of the first collector electrode and the electron source being located outside the anode structure. The method also includes collecting ions formed by collisions between the electrons and gas molecules and atoms on the first collector electrode to provide a gas pressure output. If the source that emits electrons is located outside the anode structure and the first collector electrode is located inside the anode structure, then, optionally, the method can further include locating a second collector electrode inside the anode structure. As an additional option, the method can further include locating a third collector electrode outside the anode structure, in between the first shade and the anode structure. The method can further include surrounding the electron source, the anode structure, and the collector electrode(s) with an envelope and locating a second shade between the envelope and the electron source, such that atoms sputtered off the envelope are inhibited from depositing on the electron source.

The present ionization gauge has many advantages, including minimizing the exposure of the electron source to atom flux sputtered off the collector electrode and envelope surface.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5B is a top sectional view of an ionization gauge of the present disclosure having a shade between the electron source and the collector electrode, and having the collector electrode formed of two collector electrodes.

FIG. 5C is a top sectional view of an ionization gauge of the present disclosure having a shade between the electron source and the collector electrode, and having the collector electrode formed of two collector electrodes oriented in a plane parallel to the plane of the electron source.

DETAILED DESCRIPTION OF THE INVENTION

Figure 1:
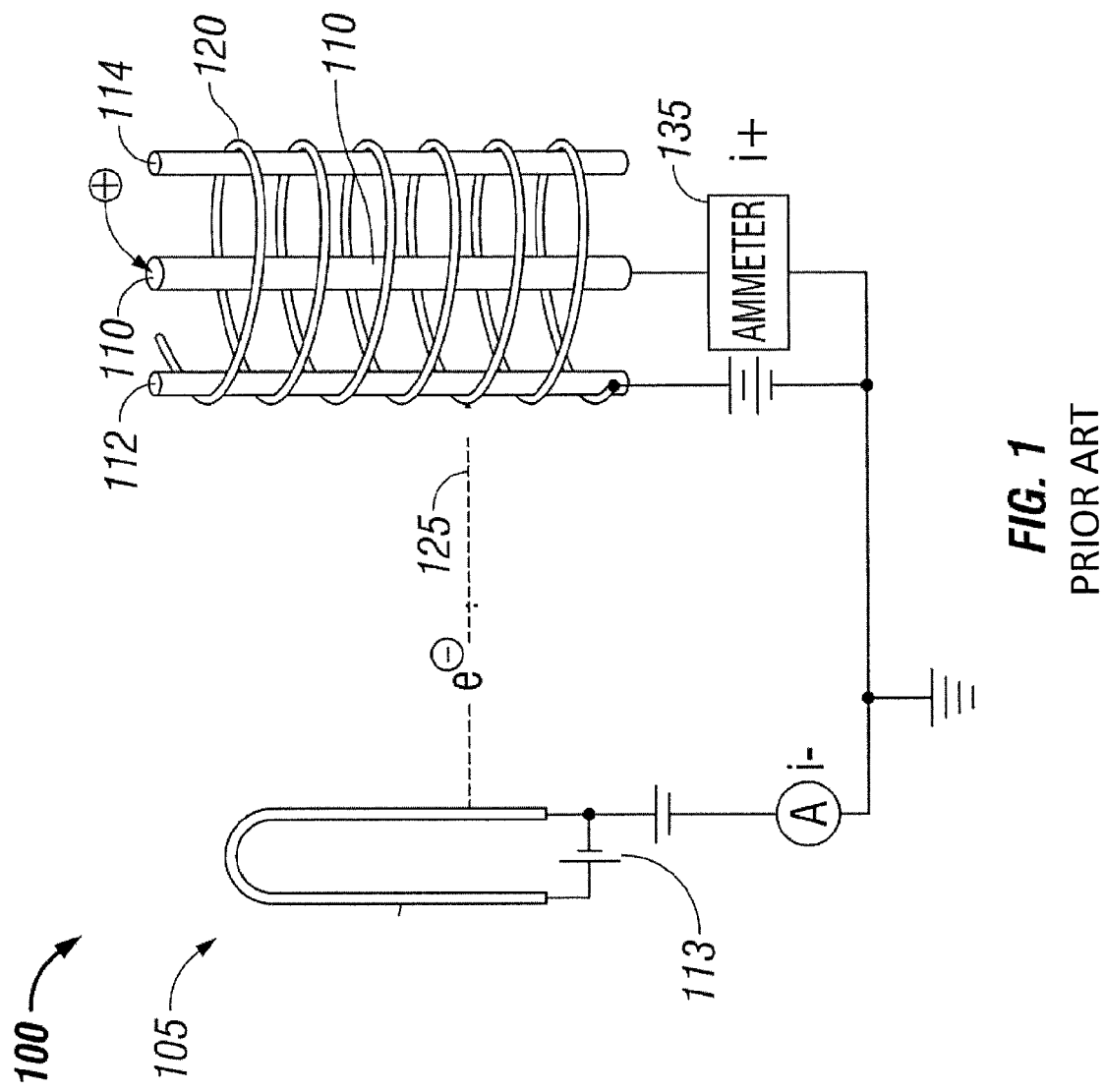
FIG. 1 is a schematic view of a generalized ionization gauge of the prior art.

As mentioned above, coating of the electron source 105, such as a hot filament, is facilitated by the typical arrangement, shown in FIG. 1, of the filament 105 and collector 110 structures side by side to one another in a parallel arrangement, often with a large surface area of the filament 105 facing the collector surface 110.

A description of example embodiments of the invention follows.

Figure 2:
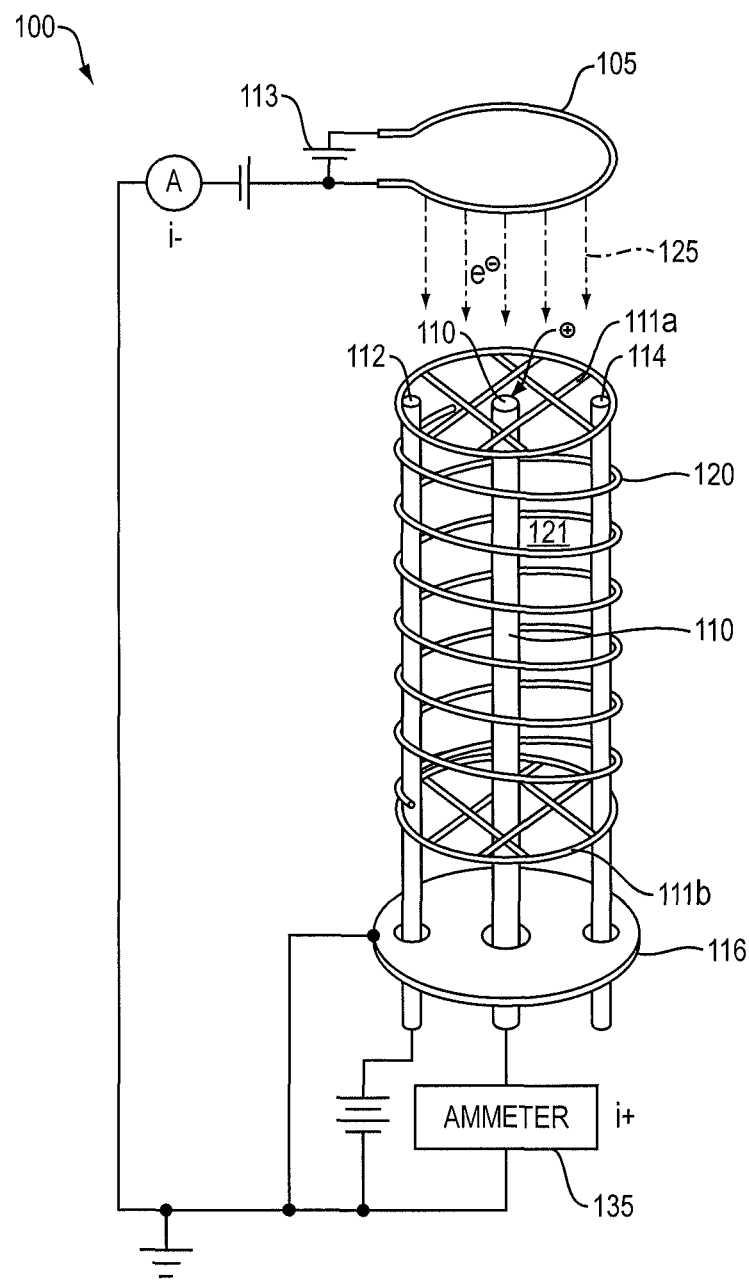
FIG. 2 is a schematic view of an ionization gauge of the present disclosure having an electron source positioned at an end of the ionization volume.

In one embodiment, shown in FIG. 2, an ionization gauge 100 of the present disclosure has an anode structure comprising a cylindrical wire grid 120 around posts 112 and 114, defining an ionization volume 121 in which electrons impact gas molecules and atoms. Two end grids 111a and 111b define the ends of the ionization volume 121. A hot cathode electron source 105 emits electrons 125, the electron source 105 being positioned at an end of the ionization volume 121. A collector electrode 110 collects ions formed by collisions between the electrons 125 and gas molecules and atoms, to provide a gas pressure output. The collector electrode 110 extends along a collector axis through the ionization volume 120, the collector axis extending through the ends of the ionization volume 121. At the other end of ionization volume 121 from the hot cathode electron source 105, the collector electrode 110 and support posts 112 and 114 protrude through the solid disk 116 that is displaced downward from end grid 111b. The electron source 105 can be, for example, a heated cathode filament, as shown in FIG. 2, or a disc cathode thermionic emitter (e.g., Kimball Physics, Inc., Wilton, N.H.).

Figure 3A:
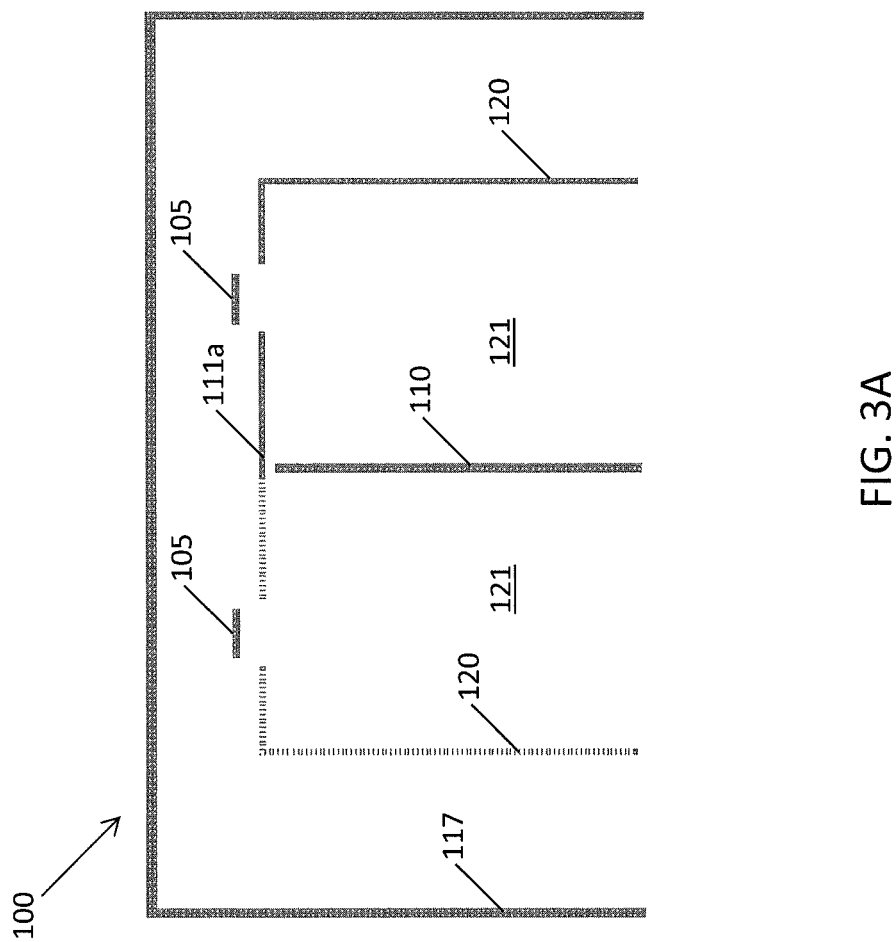
FIG. 3A is a cross-section of the ionization gauge shown in FIG. 2 with an envelope surrounding the ionization volume.
Figure 3B:
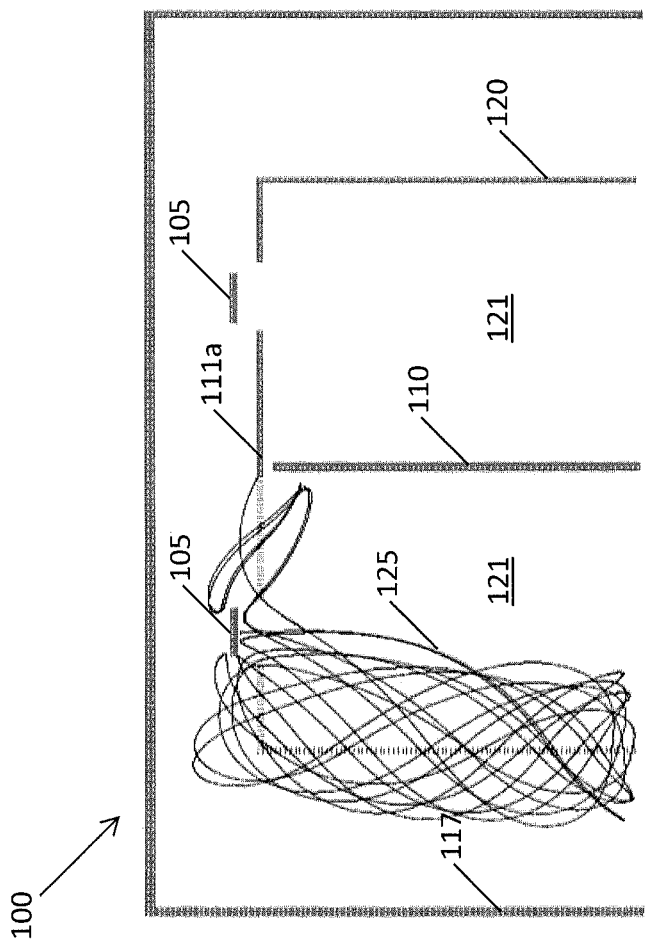
FIG. 3B is an illustration of simulated electron paths within the ionization gauge shown in FIG. 3A.

A cross-section of the upper portion of the ionization gauge 100 that includes the electron source 105 is schematically illustrated in FIGS. 3A and 3B. The ionization gauge 100 is based on the ionization of gas molecules and atoms in a measurement chamber 117 by a constant flow of electrons. The negatively charged electrons 125 shown in FIG. 3B (only shown on the left side in FIG. 3B, although electrons would similarly be on the right side) are emitted at a well-controlled selectable rate from, for example, a heated cathode 105, and can be released or accelerated toward a positively charged anode 120. The electrons 125 pass into and through the anode 120 and then cycle back and forth through the anode 120. The electrons 125 are then retained within the ionization volume of the anode 121, in part due to the potential bias on end grids 111a and 111b. In this space, the electrons 125 collide with the gas molecules and atoms to produce positively charged ions before colliding with a grid wire 120, or end grids 111a or 111b. During low pressure operation, significant ionization only occurs within the anode 120, and thus the volume 121 within the anode 120 is referred to as the ionization volume 121. Some ionization may occur outside the ionization volume 121, in particular during high pressure operation (e.g., above about $10^{-4}$ Torr), when sufficient ionization may occur for collection. The ions are collected by the ion collector 110. Collector 110 is nearly at ground potential, which is negative with respect to the positively charged anode 120. However, this arrangement is not limiting and collector 110 may have various potential differences with respect to the anode 120. See application Ser. No. 12/860,050 published as US 2011/0062961 A1, which is herein incorporated by reference in its entirety. At a constant cathode to anode voltage and electron emission current, the rate that positive ions are formed is related to the density of the gas in the gauge 100. Turning back to FIG. 2, this signal from the collector electrode 110 is detected by an ammeter 135, which is calibrated in units of pressure, for all pressure readings.

In the embodiment shown in FIG. 2, sputtered atoms from collector 110, that are typically ejected along paths that are perpendicular to the collector 110, are unlikely to deposit on filament 105, because filament 105 is positioned at an end of the ionization volume 121, out of a line of sight perpendicular to the collector electrode 110, and no longer alongside collector 110, in contrast to the arrangement shown in FIG. 1. The use of a hot cathode filament as the electron source 105 in the geometry shown in FIG. 2 enables high pressure operation of the ionization gauge 100.

Figure 4A:
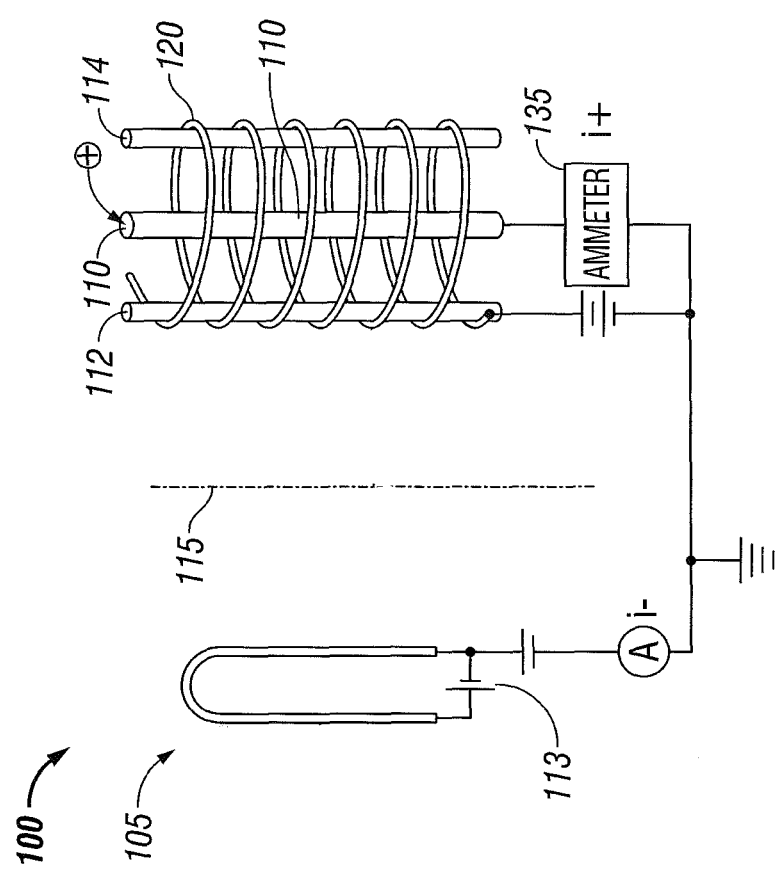
FIG. 4A is a side view of an ionization gauge of the present disclosure having a shade between the electron source and the collector electrode.
Figure 4B:
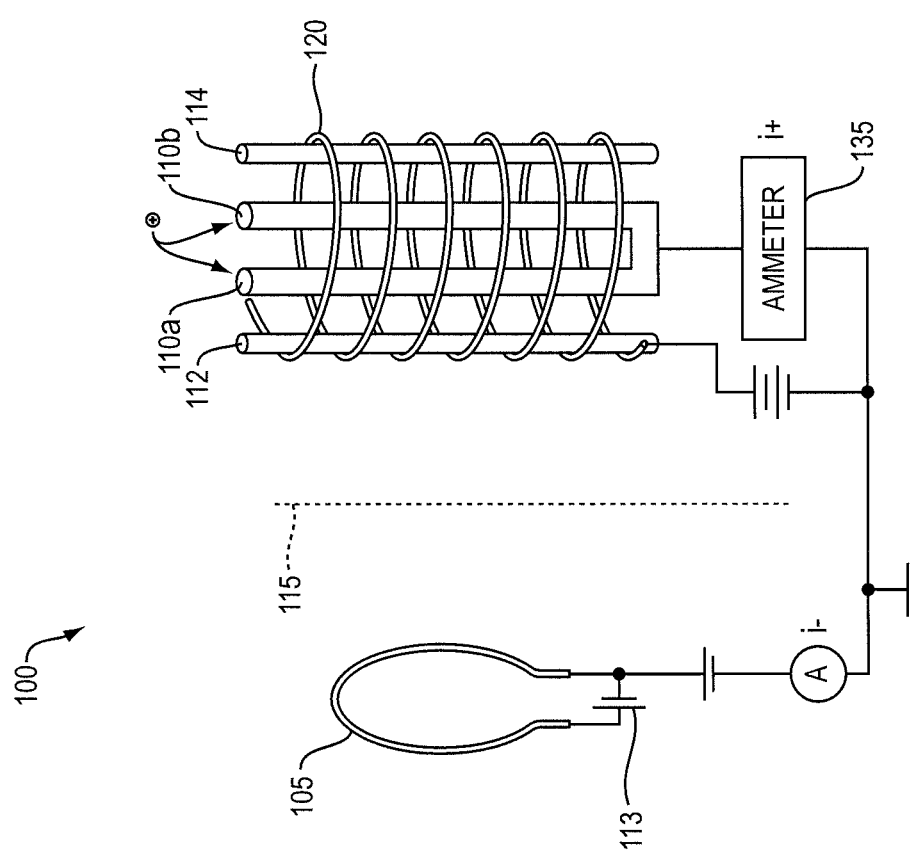
FIG. 4B is a side view of an ionization gauge of the present disclosure having a shade between the electron source and the collector electrode, and having the collector electrode formed of two collector electrodes.
Figure 5A:
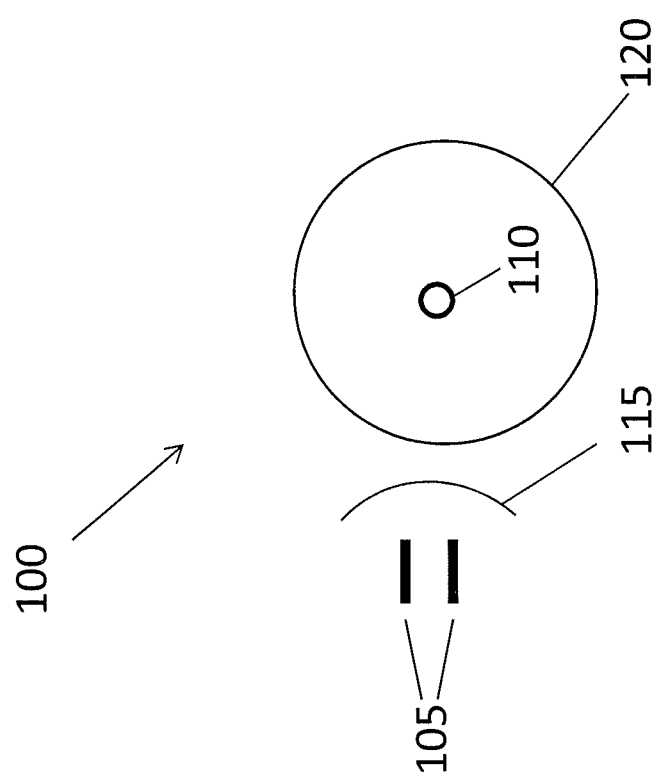
FIG. 5A is a top sectional view of an ionization gauge of the present disclosure having a shade between the electron source and the collector electrode.
Figure 5D:
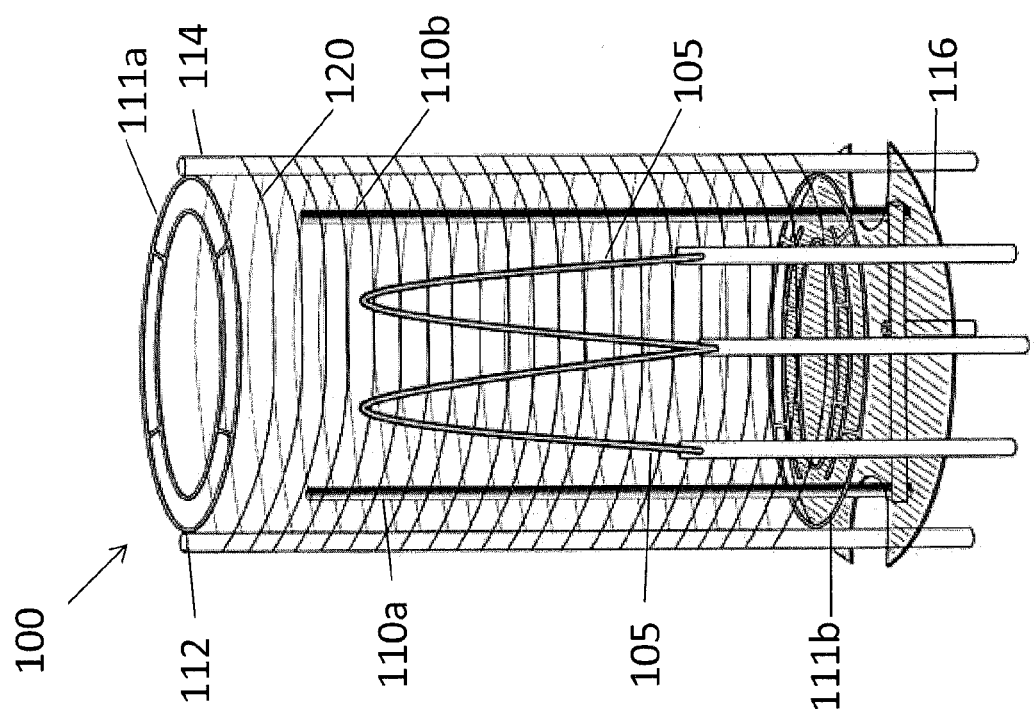
FIG. 5D is a side view of an ionization gauge of the present disclosure having a double loop electron source.
Figure 6A:
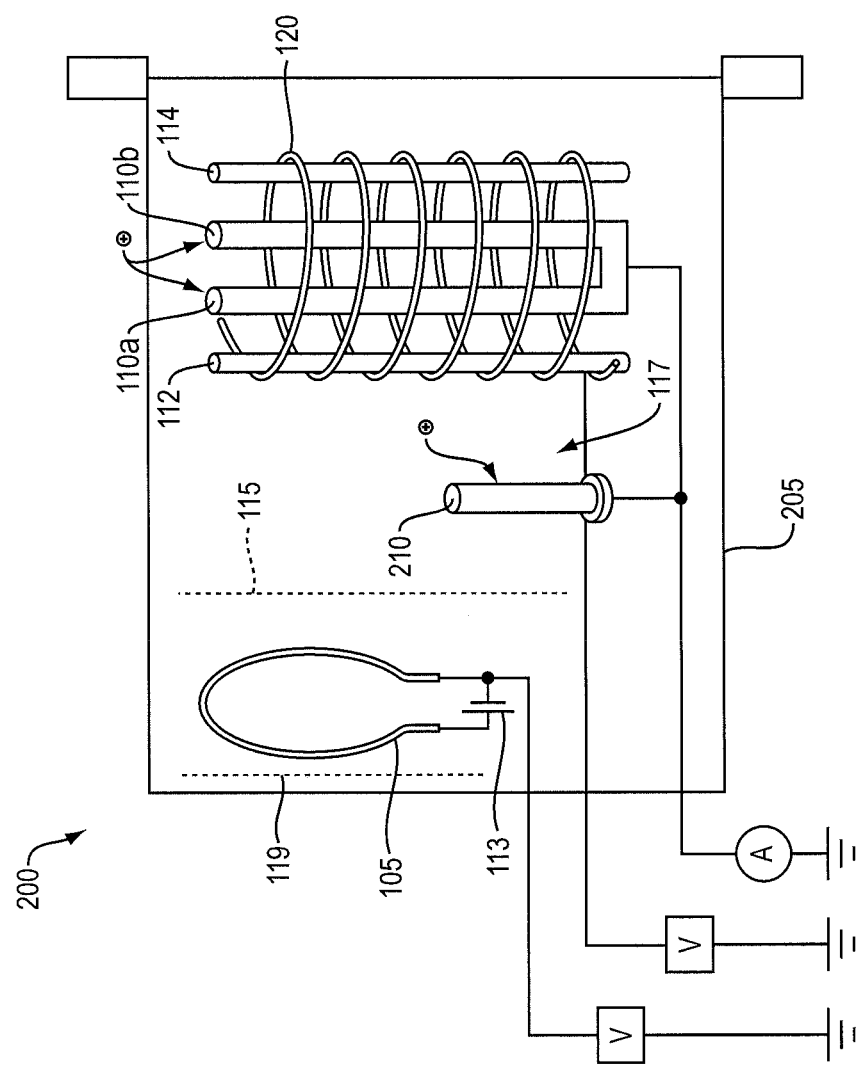
FIG. 6A is a side view of an ionization gauge of the present disclosure having an envelope, a first shade between the electron source and the collector electrodes, a second shade between the envelope and the electron source, a second collector electrode inside the anode structure, and a third collector electrode outside the anode structure.
Figure 6B:
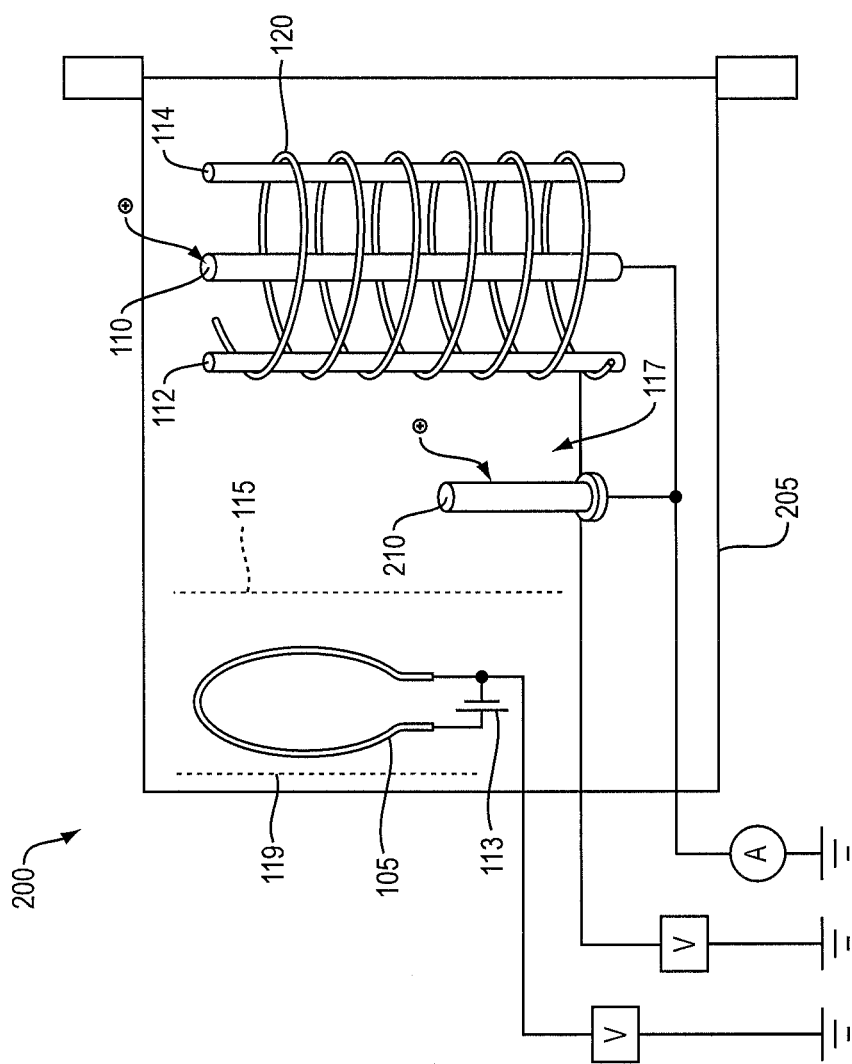
FIG. 6B is a side view of an ionization gauge of the present disclosure having an envelope, a first shade between the electron source and the collector electrodes, a second shade between the envelope and the electron source, and a collector electrode outside the anode structure.

Alternatively, as shown in FIGS. 4A, 4B, 5A, and 5B, a first shade 115 can be located between the electron source 105 and the collector 110 to effectively shield the exposed filament surfaces from the effects of sputtered collector atoms. Electric fields direct the electrons produced by electron source 105 around the shade 115 and into the ionization volume 120. The electron source can, for example, be a hot cathode as shown in FIGS. 4A and 4B, or a microchannel plate. For the microchannel plate, see application Ser. No. 12/808,983 published as US 2011/0234233 A1, which is herein incorporated by reference in its entirety. The hot cathode 105 can be a cylindrical filament shown as a single loop in FIGS. 4A and 4B, or the filament can be a double loop, as shown in FIG. 5D (where the shade 115 is not shown for clarity), or a ribbon filament, shown as top sectional views in FIGS. 5A, 5B, and 5C, the ribbon filament 105 having flat surface oriented at about 90° with respect to the collector electrode 110, such that the surface area of the filament 105 facing the collector electrode 110 is minimized. One of the collector electrode 110 and the electron source 105 can be located inside the anode structure 120, and the other of the collector electrode 110 and the electron source 105 can be located outside the anode structure 120. As shown in FIG. 6A, if the source 105 that emits electrons is located outside the anode structure 120 and the collector electrode 110 is located inside the anode structure 120, then the ionization gauge 200 can include a first collector electrode 110a and a second collector electrode 110b located inside the anode structure 120, and, optionally, a third collector electrode 210 located outside the anode structure 120, in between the first shade 115 and the anode structure 120, for high pressure measurements of very short mean free path ions formed in measurement chamber 117. Alternatively, the ionization gauge 200 can include a single collector electrode 110 located inside the anode structure 120 and a collector electrode 210 located outside the anode structure 120, as shown in FIG. 6B. Here, the collector electrode 210 is outside the ionization volume defined by the anode structure 120, but, at high pressure, ionization also occurs outside this primary ionization volume.

The embodiment in FIGS. 4A, 4B, 5A, and 5B is shown as a nude configuration of the ionization gauge 100, that is, without a surrounding gauge vessel. It is also envisioned that non-nude type ionization gauges are also possible, having an envelope 205 as shown in FIGS. 6A, 6B, discussed above and FIG. 7, that shows a top sectional view of the ionization gauge shown in FIG. 6B. At pressures greater than about $10^{-4}$ Torr, electrons emitted from the filament 105 have a high probability of colliding with gas atoms or molecules on the way to the anode 120.

Figure 7:
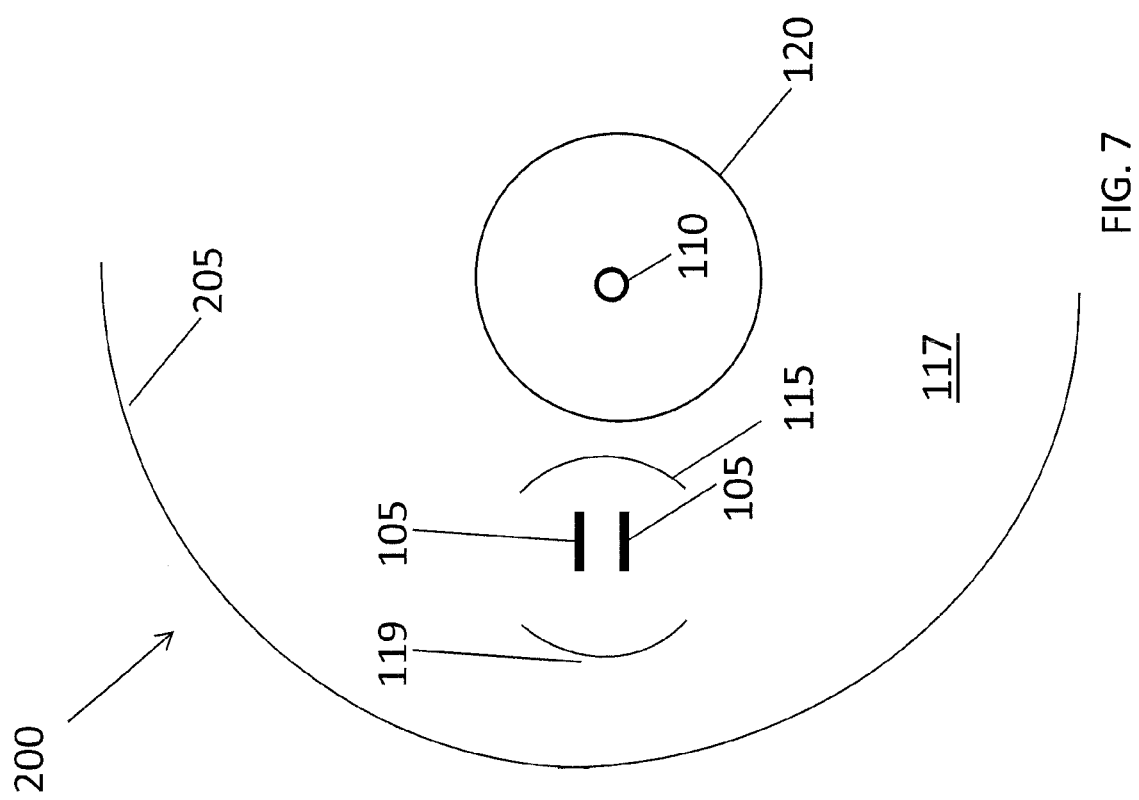
FIG. 7 is a top sectional view of an ionization gauge of the present disclosure having a first shade between the electron source and the collector electrode, and a second shade between the envelope and the electron source.

As ions are formed outside the anode 120, they are accelerated towards the envelope 205, typically made of stainless steel, and sputtering of stainless steel is now possible. Some of the component atoms of stainless steel sputtered from the envelope 205 coat the back surface of the filament 105. As the pressure continues to increase and approaches about $10^{-1}$ Torr, the majority of ionization occurs outside the anode 120 and stainless steel wall sputtering becomes the main source of material deposited on the filament 105. The resulting typical deposition pattern on the filament 105 is a coating of stainless steel component atoms on the side of the filament 105 facing the envelope 205 and a coating of tungsten on the side of the filament 105 facing the collector 110. FIGS. 6A, 6B, and 7 show specific non-nude type ionization gauges 200, wherein a second shade 119 is used to shield the electron source 105 from the effects of atoms sputtered off the envelope 205, that is, atoms sputtered off the envelope 205 are inhibited from depositing on the electron source 105. The first and second shades, 115 and 119, respectively, can be shaped metal plates, such as, for example, stainless steel. The electric potential of the shades can be the same as the cathode potential or slightly lower than the cathode potential, and therefore not subject to the sputtering problems discussed above.

A method of measuring pressure with an ionization gauge 100 described above and shown in FIG. 2 includes emitting electrons from a hot cathode electron source 105 positioned at an end of an ionization volume 120, the electrons colliding with gas molecules and atoms inside an anode structure comprising a cylindrical mesh grid that defines the ionization volume 120. The method further includes collecting ions formed by collisions between the electrons and gas molecules and atoms on a collector electrode 110 to provide a gas pressure output. The collector electrode 110 extends along a collector axis through the ionization volume, the collector axis extending through the ends of the ionization volume.

Alternatively, a method of measuring pressure with an ionization gauge 200 described above and shown in FIGS. 6A, 6B, and 7 includes emitting electrons from an electron source 105, the electrons colliding with gas molecules and atoms inside an anode structure comprising a cylindrical mesh grid that defines an ionization volume 120. The method further includes locating a first shade 115 outside of the ionization volume between the electron source 105 and the collector electrode 110, one of the collector electrode 110 and the electron source 105 being located inside the anode structure 120, and the other of the collector electrode 110 and the electron source 105 being located outside the anode structure 120, and collecting ions formed by collisions between the electrons and gas molecules and atoms on the collector electrode 110 to provide a gas pressure output. If the source 105 that emits electrons is located outside the anode structure 120 and the collector electrode 110 is located inside the anode structure 120, then, optionally, the method can further include locating a first and a second collector electrode (110*a* and 110*b*, respectively) inside the anode structure 120 and, additionally, the method can further include locating a third collector electrode 210 outside the anode structure 120, in between the first shade 115 and the anode structure 120, as shown in FIG. 6A. The method can further include locating a second shade 119 between the envelope 205 and the electron source 105, such that atoms sputtered off the envelope 205 are inhibited from depositing on the electron source 105. The pressure can be in a range of between about $10^{-1}$ Torr and about $10^{-4}$ Torr.

The relevant teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. An ionization gauge to measure pressure comprising:
    an extended anode structure comprising a grid extending along a longitudinal axis, the grid defining an ionization volume within the grid in which electrons impact gas molecules and atoms, opposite ends of the grid defining opposite ends of the ionization volume;
    a hot cathode electron source that emits electrons into the ionization volume, the electron source being positioned at one of the opposite ends of the ionization volume; and
    an ion collector electrode to collect ions formed by collisions between the electrons, emitted by the hot cathode electron source, and gas molecules and atoms, to provide a gas pressure output, the ion collector electrode extending through the ionization volume within the grid along an ion collector axis substantially parallel to the longitudinal axis of the grid, the ion collector axis extending through the opposite ends of the ionization volume.

2. The ionization gauge of claim 1, wherein the grid is a cylindrical grid.

3. A method of measuring pressure with an ionization gauge comprising:
    emitting electrons from a hot cathode electron source positioned at one of opposite ends of an ionization volume, the electrons colliding with gas molecules and atoms inside an extended anode structure comprising a cylindrical grid that defines the ionization volume within the grid, the cylindrical grid extending along a longitudinal axis, opposite ends of the cylindrical grid defining opposite ends of the ionization volume; and
    collecting ions formed by collisions between the electrons, emitted by the hot cathode electron source, and gas molecules and atoms on an ion collector electrode to provide a gas pressure output, the ion collector electrode extending through the ionization volume within the grid along an ion collector axis substantially parallel to the longitudinal axis of the grid, the ion collector axis extending through the opposite ends of the ionization volume.

4. The method of claim 3, wherein the pressure is in a range of between about $10^{-1}$ Torr and about $10^{-4}$ Torr.

* * * * *